United States Patent
Lahde

[15] 3,664,199
[45] May 23, 1972

[54] BRUSHLESS D.C. MOTOR DRIVEN GYROSCOPE

[72] Inventor: Reinhard N. Lahde, Los Altos, Calif.

[73] Assignee: Lockheed Aircraft Corporation, Burbank, Calif.

[22] Filed: Jan. 12, 1970

[21] Appl. No.: 2,066

[52] U.S. Cl....................................................74/5.6, 74/5.7
[51] Int. Cl......................................................G01c 19/28
[58] Field of Search..........................74/5.7, 5, 5.8, 5.37, 5.6; 308/10

[56] References Cited

UNITED STATES PATENTS

| | | | |
|---|---|---|---|
| 3,499,333 | 3/1970 | Abel | 74/5.7 |
| 1,311,509 | 7/1919 | Hebrard | 74/5.7 |
| 1,385,423 | 7/1921 | Bibbins | 74/5.7 X |
| 1,295,003 | 2/1919 | Chandler | 74/5 X |
| 1,802,108 | 4/1931 | Chessin | 74/5.7 X |
| 3,451,274 | 6/1969 | Davies et al. | 74/5 |
| 3,503,269 | 3/1970 | O'Connor | 74/5.7 X |

*Primary Examiner*—Manuel A. Antonakas
*Attorney*—George C. Sullivan and Ralph M. Flygare

[57] ABSTRACT

An electrical gyroscope having an annular electromagnetic field structure and a magnetic rotor gimbaled within the field structure in such a way that the gimbal support carries only the rotor and not the field structure. The field structure is connected to a D.C. source through a switching circuit which intermittently energizes the field structure in the proper timing to drive the rotor at a high spin rate with a brushless D.C. motor action.

11 Claims, 9 Drawing Figures

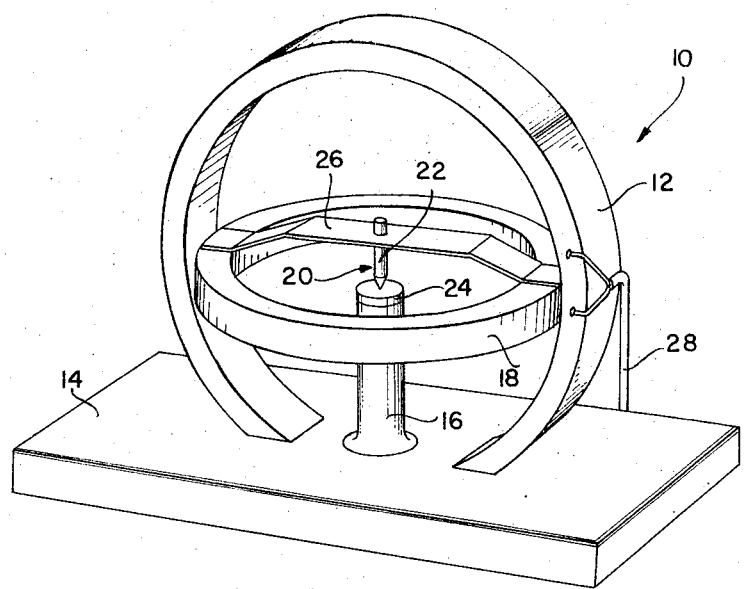
FIG_1
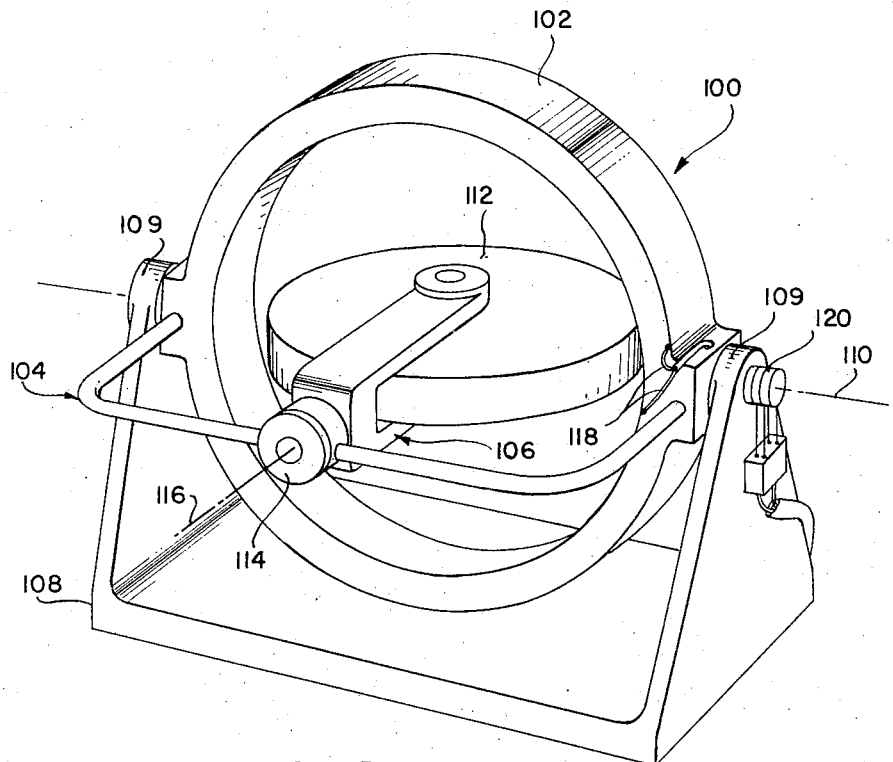
FIG_2
INVENTOR.
REINHARD N. LAHDE

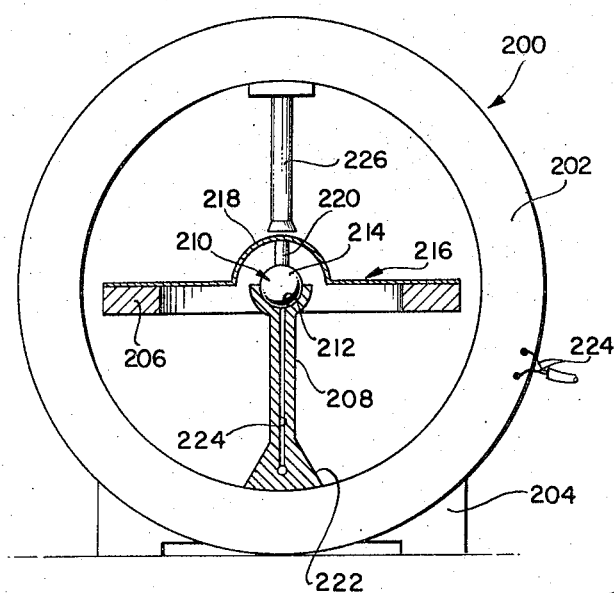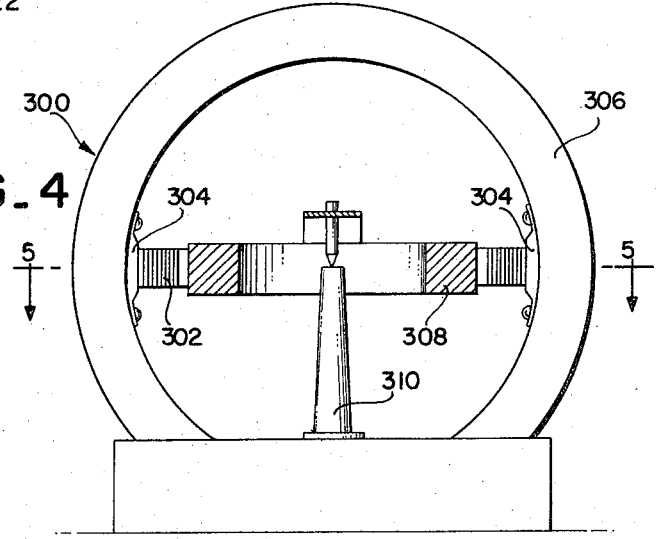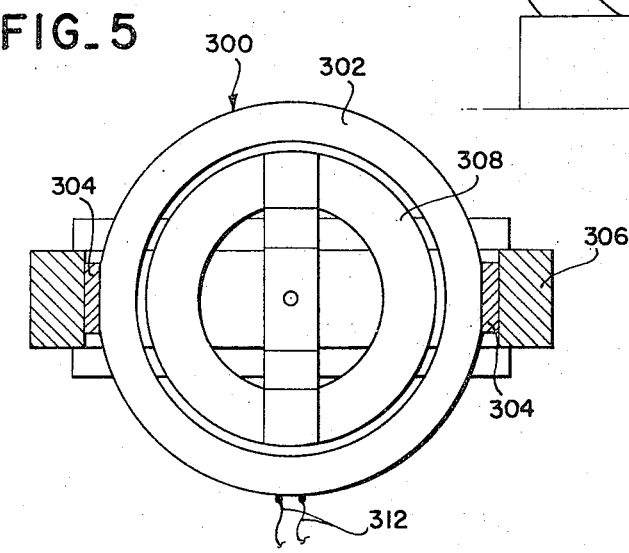

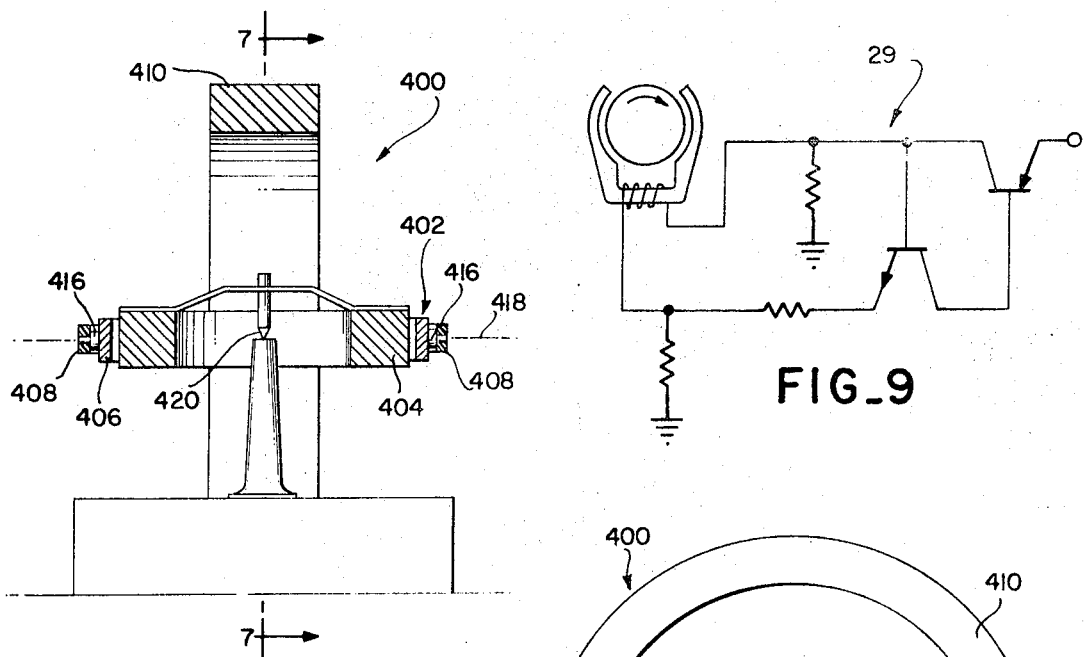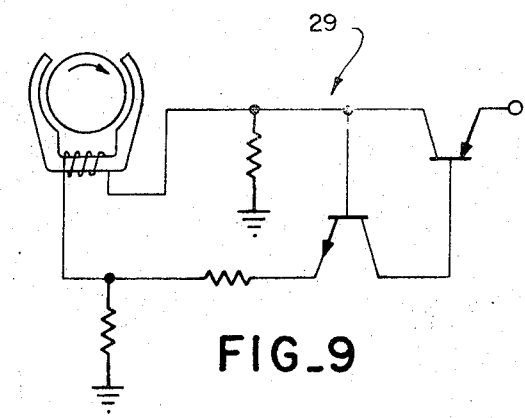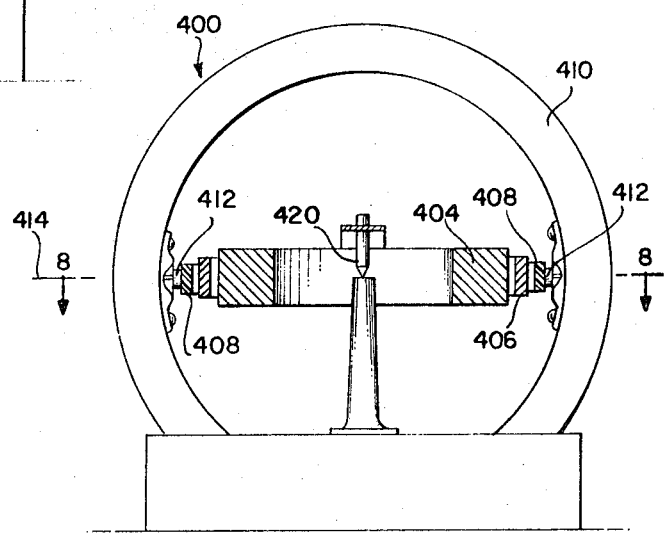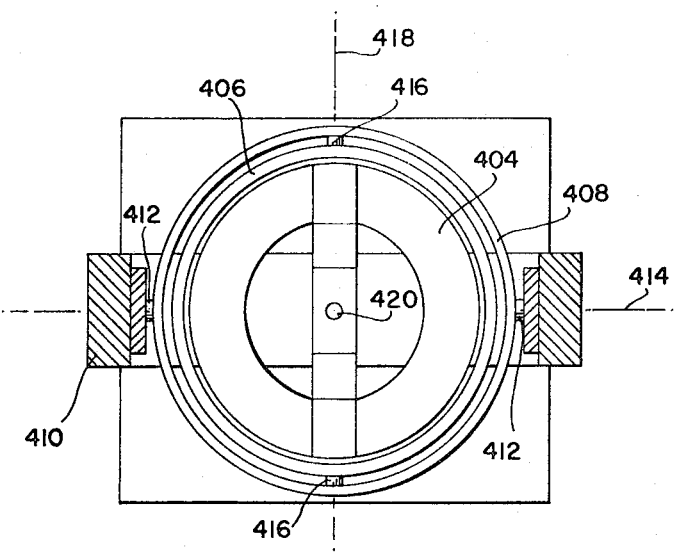

BRUSHLESS D.C. MOTOR DRIVEN GYROSCOPE

REFERENCE TO COPENDING APPLICATIONS

Reference is made herein to my copending application Ser. No. 389,118, filed Aug. 12, 1964, and entitled "D. C. MOTOR", now U.S. Pat. No. 3,541,407 and to my copending application Ser. No. 876,757, filed Nov. 14, 1969, and entitled "SELF-STARTING D. C. MOTOR."

BACKGROUND OF THE INVENTION

1. Field of the Invention

This invention relates generally to gyroscopes and more particularly to a novel electrical gyroscope having at least two degrees of freedom and characterized by simplicity of construction, economy of manufacture, relatively small size, and relatively low electrical power consumption.

2. Prior Art

A conventional electrical gyroscope with at least two degrees of freedom has a rotor driven by an electric motor and an inner gimbal which supports both the rotor and the entire rotor drive motor including the stationary motor field structure. The inner gimbal bearings must therefore be designed to support the combined weight of the rotor and the drive motor. As a consequence, the existing gyroscopes are typically characterized by relatively complex construction, large size, high cost of manufacture, and large electrical power consumption. These gyroscopes are also frequently troubled by bearing friction, slip ring friction, and gimbal problems.

SUMMARY OF THE INVENTION

The present invention provides a novel gyroscope which avoids the above noted and other deficiencies of the existing gyroscopes. Briefly stated, this is accomplished by separating the stationary field structure of the rotor drive motor from the inner gimbal which supports the rotor in such a way that the gimbal support carries only the weight of the rotor. Moreover, the motor is a brushless motor which is entirely devoid of slip rings, make and break contacts, or other mechanical current switching devices. These features result in a gyroscope which is extremely simple in construction, economical to manufacture, small in size, light in weight, and consumes very little electrical power.

To these ends, the present gyroscope is equipped with a magnetic gyroscope rotor surrounded by an annular electromagnetic field structure. The rotor has circumferentially spaced north and south magnetic poles and is supported within the field structure by gimbal means which support the rotor only and not the field structure. The field structure is connected to a D. C. source through a switching circuit which intermittently energizes the field structure in the proper timing to drive the rotor at a high spin rate by a brushless D.C. motor action. This type of brushless D. C. motor action may be accomplished with various types of switching circuits. A preferred circuit for this purpose is that disclosed in the earlier mentioned copending application Ser. No. 389,118, entitled "D. C. MOTOR", now U.S. Pat. No. 3,541,407. This preferred switching circuit is a solid state circuit which is triggered by voltages induced in the field coil in response to rotation of the rotor in such a way that the circuit energizes the coil intermittently in the proper timing to drive the rotor. If desired, the gyroscope may be equipped with means to arrest the rotor in self-starting relation to the field coil, according to the disclosure in the aforementioned copending application Ser. No. 876,757, entitled "SELF-STARTING D.C. MOTOR."

BRIEF DESCRIPTION OF THE DRAWINGS

FIG. 1 is a perspective view of a gyroscope according to the invention;
FIG. 2 is a perspective view of a modified gyroscope;
FIG. 3 is a side elevation of a further modified gyroscope;
FIG. 4 is a side elevation of yet a further modified gyroscope;
FIG. 5 is a section taken on line 5—5 in FIG. 4;
FIG. 6 is a section through yet a further modified gyroscope;
FIG. 7 is a section taken on line 7—7 in FIG. 6;
FIG. 8 is a section taken on line 8—8 in FIG. 7; and
FIG. 9 is a schematic diagram of a switching circuit for the gyroscope motor.

DESCRIPTION OF THE PREFERRED EMBODIMENTS

Turning first to FIG. 1, there is illustrated a simple gyroscope 10 according to the invention having an angular electromagnetic field structure or coil 12 mounted on edge on a supporting base 14. Rising from the base within the field coil is a pedestal 16. A rotor 18 is supported on the upper end of this pedestal by means of a universal gimbal bearing 20 whose pivot center is located on the axis of the rotor and at the approximate geometric center of the field coil 12. The center of gravity of the rotor is located on the rotor axis, slightly below the gimbal pivot center, whereby the rotor is self-erecting under the action of gravity. In the particular embodiment illustrated, the gimbal bearing 20 comprises a bearing needle 22 fixed to the rotor and a bearing cup 24 on the upper end of the pedestal 16 having a recess rockably seating the lower point of the bearing needle. This arrangement provides for the gyro two degrees of freedom in addition to rotation on its spin axis.

Rotor 18 comprises a relatively high density magnetic ring having diametrically opposed north and south poles N and S. Fixed at its ends to and extending diametrically across the rotor ring is a strap 26 to which the upper end of the bearing needle 22 is rigidly secured. This strap arches upwardly at its center to permit location of the bearing needle point slightly above the center of gravity of the rotor without interference between the strap and the pedestal 16.

Extending from the field coil 12 are leads 28 for connection to an electrical switching circuit (FIG. 9) 29 for intermittently energizing the coil in the proper timing to drive the rotor 18 in rotation at a high spin rate. As noted earlier, a variety of switching circuits may be employed for this purpose. However, the preferred switching circuit for the gyroscope is that disclosed in the earlier mentioned U.S. Pat. No. 3,541,407, entitled "D. C. MOTOR." This preferred switching circuit is a solid state switching circuit which is triggered by the voltages induced in the field coil 12 in response to rotation of the rotor 18 in such a way that the circuit intermittently energizes the coil in the proper timing to drive the rotor at a high spin rate.

From the description to this point, it is evident that the field coil 12 and rotor 18 together constitute a brushless D. C. motor of the general type disclosed in the above-mentioned patent. The primary advantage of this type of motor resides in its omission of slip rings, make and break contacts, or other mechanical switching means for reversing the current flow in the armature. This omission, in turn, reduces the friction forces active on the rotor. Moreover, since the gimbal bearing 20 supports only the weight of the rotor, and not the field coil, the bearing may be relatively small in size, thereby further reducing friction as well as size and normal gimbal problems.

As discussed in the aforementioned copending application Ser. No. 876,757, entitled "SELF-STARTING D. C. MOTOR," a brushless D. C. motor of the kind embodied in the present gyroscope is self-starting only if the rotor 18 is initially in the proper self-starting relation to the field coil 12. This self-starting relation is one wherein the motor poles N, S are disposed in a plane transverse to the plane of the field coil. The last mentioned copending application also discloses means for arresting the rotor in the self-starting position. If desired, the present gyroscope may be equipped with such self-starting means.

From the foregoing description, it is evident that intermittent energizing of the field coil 12 by the external switching circuit 29 drives the rotor 18 at a high spin rate. The gyroscopic forces then active on the rotor tend to maintain the latter in a fixed orientation relative to the horizontal regardless of the angular position of the relatively stationary gyroscope structure, i.e., the field coil 12, mounting base 14, and pedestal 16.

The gimbal bearing 20 performs the dual function of supporting the rotor 18 for turning on its spin axis and accommodating the relative angular movements which occur between the rotor and the stationary gyroscope structure during changes in the angular orientation of this structure.

FIG. 2 illustrates a modified gyroscope 100 according to the invention in which the electromagnetic field structure or coil 102 participates in one degree of freedom of the gyroscope. This modified gyroscope has two gimbals 104 and 106. The outer gimbal 104 carries the field coil 102 and is supported on a base 108 by gimbal bearings 109 having a common axis 110 coinciding with a diameter of the coil. The inner gimbal 106 carries the magnetic gyroscope rotor 112 and is supported on the outer gimbal 104 by a gimbal bearing 114. This gimbal bearing has a rotation axis 116. Gimbal axes 110, 116 intersect at right angles at the approximate geometric center of the field coil and on the axis of rotor 112 at its center of gravity. In this instance, the inner gimbal 106 comprises a yoke which straddles the rotor 112.

Extending from the field coil 102 are leads 118. These leads connect to an external switching circuit for energizing the field coil from the D.C. source in the proper timing to drive the rotor at a high spin rate in the same manner as discussed above in connection with FIG. 1. If desired, the coil leads 118 may connect to the external switching circuit through a slip ring assembly 120 to prevent the leads from resisting rotation of the outer gimbal on its axis 110. Alternately, a small battery and the transistors which make up the switching circuit could be attached to the outer gimbal structure 10, thereby obiviating the need for sliprings.

The operation of the gyroscope 100 of FIG. 2 is essentially the same as that of FIG. 1. The gyroscope rotor 112 also has two degrees of freedom in addition to rotation on its spin axis. These degrees of freedom are rotation on its gimbal axis 110 and rotation on its gimbal axis 116. The field coil 102 has a single degree of freedom involving rotation on the gimbal axis 110.

Turning to FIG. 3, there is illustrated a modified gyroscope 200 according to the invention having an annular field structure or coil 202 mounted on edge on its supporting base 204. Within the field coil 202 is an annular magnetic rotor 206 supported on a pedestal 208 by means of a universal gimbal bearing 210.

Gimbal bearing 210 comprises a hemispherical socket 212 in the upper end of the pedestal 208. The geometric center of this socket is located at the approximate geometric center of the field coil 202. Contained within the socket 212 to swivel and spin in the socket is a ball 214. The annular magnetic rotor 206 has a diametrical strap 216 with a central arch 218 overlying the ball 214. The rotor 206 is supported on the ball 214 by a shaft 220 extending between and fixed to the ball and the arch 218. The center of gravity of the rotor is located slightly below the swivel center of the gimbal bearing 210 so as to render the rotor self-erecting. At the base of the pedestal 208 is a conical surface 222 for limiting swivel motion of the rotor 206 on its gimbal bearing 210. As in the previous embodiments of the invention, the field coil 202 has leads 224 to be connected to an external switching circuit for energizing the coil in the proper timing to drive the rotor 206 at a high spin rate.

The ball 214 of the gimbal bearing 210 is preferably supported in its socket 212 by means of a gas bearing. To this end, the pedestal 208 has a passage 224 opening upwardly to the socket through which a suitable gas under pressure may be supplied to the socket for floating the ball in the socket.

Depending from the top of the field coil 220 directly over the pedestal 208 is a strut 226. The lower end of this strut is spaced slightly from the upper surface of the rotor strap arch 218 so as to prevent unseating of the gimbal bearing 210. From the foregoing description, it is evident that the gyroscope 200 of FIG. 3 operates in essentially the same manner as the gyroscope of FIG. 1 except that the gyroscope rotor in FIG. 3 is supported by a ball and socket gimbal bearing rather than a needle bearing.

FIG. 4 illustrates a gyroscope 300 which is identical to that of FIG. 1 except for the addition of an annular rotor position pick-up or sensing coil 302. Coil 302 is rigidly secured at 304 to the field coil 306 and is disposed in a plane which coincides with the plane of the magnetic gyroscope rotor 308 in a selected angular position of the rotor relative to the field coil 308 and gimbal pedestal 310. In this instance, the selected angular position is one in which the plane of the rotor is normal to the longitudinal axis of the pedestal.

Coil 302 acts as a pick-up coil which generates an electrical output representing the angular deviation or deflection of the rotor plane from the plane of the pick-up coil, and hence also the orientation of the rotor. This signal may be fed through leads 312 to an external circuit (not shown) for displaying the rotor orientation. The electrical principles by which this rotor position sensing action is accomplished are well known. Thus, with zero deflection of the rotor, that is, coplanar relation of the rotor and pick-up coil, no voltage is induced in this coil. When the gyro is tilted, an A. C. voltage of a frequency proportional to the rotor speed is generated in the pick-up coil. This voltage can be converted, by known circuitry, to a display of the rotor orientation.

FIGS. 6 – 8 illustrate a gyroscope 400 like that of FIG. 1 which is equipped with means 402 for aiding or effecting gravity erection of the magnetic gyroscope rotor 404. Erection means 402 comprises an electrically conductive short circuit ring 406 surrounding the rotor 404. Surrounding the short circuit ring 406, in turn, is a gimbal ring 408. Gimbal ring 408 is constructed of an electrically non-conductive and non-magnetically permeable material. The gimbal ring is pivotally mounted on the field coil 410 by a first set of gimbal bearings 412 having a common axis 414 coinciding with diameters of the gimbal ring and the field coil. The gimbal ring 408 is pivotally attached to the short circuit ring 406 by a second set of gimbal bearings 416 having a common axis 418 normal to the gimbal axis 414 and coinciding with a diameter of the gimbal rings. The gimbal axes 414, 418 intersect approximately at the swivel center of the rotor gimbal bearing 420. The center of gravity of the short circuit ring 406 is located slightly below the intersection point of the gimbal axes. Accordingly, the short circuit ring tends to assume a horizontal orientation regardless of the angular orientation or position of the gyro support. The short circuit ring and gyro rotor coact to produce an erecting action on the rotor which tends to maintain the rotor in the same horizontal orientation as the short circuit ring. This rotor erecting action is based on the fact that electrical currents are induced in the short circuit ring when the plane of the rotor deviates from the plane of the ring. These electrical currents tend to precess the rotor in such a manner as to remove the relative angle between these two planes.

If desired, the short circuit ring 406 may comprise a coil having leads which are normally short circuited to effect a rotor erecting action, in the manner explained above. The connection between the short circuit coil leads may be opened when the error angle between the plane of the rotor and the plane of the short circuit coil exceeds a certain value. This would reduce or virtually eliminate the tendency of the magnetic action between the rotor and the short circuit ring or coil to retard rotation of the rotor. It would also reduce the tendency to miserection of the rotor in certain applications.

The present gyroscope may be employed for a variety of purposes. For example, the gyroscope may be employed as a horizon indicator for airplanes and other vehicles, such as boats, enabling measurements of the angular motions of the vehicle relative to the horizon. The gyroscope may also be employed as a directional gyro for airplanes and other vehicles as well as a sensing element for an inertial platform. Alternatively, the gyroscope may be utilized as a display model for lectures, to explain and demonstrate gyroscopic principles, and as a fascinating and educational toy.

As noted earlier, the preferred switching circuit for intermittently energizing the electromagnetic field structure or coil of a present gyroscope is that disclosed in the aforementioned U.S. Pat. No. 3,541,407 entitled "D. C. MOTOR." This circuit, which is diagrammatically illustrated in FIG. 9, comprises a solid state switching circuit which is triggered by voltages induced in the field coil in response to rotation of the magnetic rotor to intermittently energize the coil in the proper timing to drive the rotor at a high spin rate with a brushless D. C. motor action. Since this switching circuit is fully described in the copending application, no further description of the circuit is required in this disclosure.

What is claimed as new in support of Letters Patent is:

1. An electrical gyroscope comprising:
an annular electromagnetic field structure;
means supporting said field structure in a first plane;
a magnetic gyroscope rotor having a central spin axis, a center of gravity on said axis, and north and south magnetic poles spaced circumferentially about said axis, the plane of rotation of said rotor normally being transverse to said first plane;
gimbal means supporting said rotor within said field structure for rotation on its spin axis and relative tilting movement of said field structure and rotor about a pivot center on said axis adjacent said center of gravity and the geometric center of said field structure; and
means connected to said field structure for intermittent energization from a D.C. source in timed relationship with respect to the instantaneous position of the magnetic poles of said rotor so as to spin said rotor at a high spin rate on said spin axis.

2. An electrical gyroscope according to claim 1 wherein:
said gimbal means comprises a needle bearing lying in said first plane and having a conical bearing tip and a bearing socket rockably seating said bearing tip.

3. An electrical gyroscope according to claim 1 wherein:
said gimbal means comprises a ball and socket swivel coupling lying in said first plane having a swivel center coinciding approximately with said pivot center.

4. An electrical gyroscope according to claim 3 including:
means for supplying gas under pressure to said bearing socket to float said ball in said socket.

5. An electrical gyroscope according to claim 1 wherein:
said gimbal means comprises a first gimbal member pivotally supported on said field structure on a first gimbal axis coinciding approximately with a diameter of said field structure and a second gimbal member pivotally supported on said first member on a second gimbal axis intersecting said first gimbal axis at right angles approximately at said pivot center, and means rotatably supporting said rotor on said second gimbal member with its spin axis passing through the gimbal axis intersection normal to said second gimbal axis and its plane of rotation transverse to said first plane.

6. An electrical gyroscope according to claim 5 wherein:
said field structure is carried by said first gimbal member for rotation with said member about said first gimbal axis.

7. An electrical gyroscope according to claim 1 wherein:
said pivot center and center of gravity are slightly displaced along said spin axis, whereby gravity produces a self-erecting force on said rotor.

8. An electrical gyroscope according to claim 1 including:
means for sensing the angular orientation of said rotor relative to said field structure about said pivot center.

9. An electrical gyroscope according to claim 8 wherein:
said sensing means comprises a coil fixed to said field structure in a plane passing through said pivot center in a manner such that rotation of said rotor induces in said coil a voltage representing the angular position of said rotor relative to said coil.

10. An electrical gyroscope according to claim 1 including:
electromagnetic rotor erection means comprising a short circuit ring, gimbal means supporting said ring on said field structure in a manner such that gravity produces a self-erecting force on said ring for normally retaining said ring in a horizontal position wherein the geometric center of said ring coincides approximately with said pivot center.

11. An electrical gyroscope according to claim 10 wherein:
said short circuit ring comprises a coil of wire having opposite ends, and switch means for selectively electrically connecting said ends to one another.

* * * * *